(12) United States Patent
Mohr et al.

(10) Patent No.: US 11,946,204 B2
(45) Date of Patent: Apr. 2, 2024

(54) TITANIUM DIOXIDE-FREE CIGARETTE TIPPING INKS

(71) Applicant: SUN CHEMICAL CORPORATION, Parsippany, NJ (US)

(72) Inventors: Dana Mohr, Colonial Heights, VA (US); Jarol Osorio, Charlotte, NC (US)

(73) Assignee: Sun Chemical Corporation, Parsippany, NJ (US)

( * ) Notice: Subject to any disclaimer, the term of this patent is extended or adjusted under 35 U.S.C. 154(b) by 0 days.

(21) Appl. No.: 17/781,942

(22) PCT Filed: Nov. 9, 2021

(86) PCT No.: PCT/US2021/058538
§ 371 (c)(1),
(2) Date: Jun. 2, 2022

(87) PCT Pub. No.: WO2022/103716
PCT Pub. Date: May 19, 2022

(65) Prior Publication Data
US 2023/0002973 A1    Jan. 5, 2023

Related U.S. Application Data

(60) Provisional application No. 63/112,736, filed on Nov. 12, 2020.

(51) Int. Cl.
| | |
|---|---|
| D21H 19/42 | (2006.01) |
| A24C 5/00 | (2020.01) |
| A24C 5/56 | (2006.01) |
| A24D 1/02 | (2006.01) |
| B41M 1/04 | (2006.01) |
| B41M 1/10 | (2006.01) |
| B41M 3/00 | (2006.01) |
| C09D 11/033 | (2014.01) |
| C09D 11/037 | (2014.01) |
| C09D 11/14 | (2006.01) |
| D21H 19/38 | (2006.01) |
| D21H 19/52 | (2006.01) |
| B05D 1/26 | (2006.01) |

(52) U.S. Cl.
CPC ............ *D21H 19/42* (2013.01); *A24C 5/005* (2013.01); *A24C 5/565* (2013.01); *A24D 1/02* (2013.01); *B41M 1/04* (2013.01); *B41M 1/10* (2013.01); *B41M 3/006* (2013.01); *C09D 11/033* (2013.01); *C09D 11/037* (2013.01); *C09D 11/14* (2013.01); *D21H 19/385* (2013.01); *D21H 19/52* (2013.01); *B05D 1/26* (2013.01)

(58) Field of Classification Search
CPC ...... D21H 19/42; D21H 19/385; D21H 19/52; A24C 5/005; A24C 5/565; A24D 1/02; B41M 1/04; B41M 1/10; B41M 3/006; B05D 1/26

USPC ......................................................... 427/256
See application file for complete search history.

(56) References Cited

U.S. PATENT DOCUMENTS

| | | | | |
|---|---|---|---|---|
| 4,340,074 A | * | 7/1982 | Tudor | A24C 5/58 131/365 |
| 4,411,279 A | * | 10/1983 | Martin | A24C 5/472 131/92 |
| 4,880,465 A | * | 11/1989 | Loria | C09D 11/30 347/100 |
| 5,129,408 A | * | 7/1992 | Jakob | A24B 15/14 131/359 |
| 5,129,409 A | * | 7/1992 | White | A24B 15/165 131/84.1 |
| 5,415,186 A | * | 5/1995 | Casey, III | A24B 15/287 131/365 |
| 5,722,433 A | * | 3/1998 | Ishino | D21H 19/44 131/365 |
| 5,830,318 A | * | 11/1998 | Snow | A24C 5/56 131/365 |
| 6,099,628 A | * | 8/2000 | Nohr | C09D 11/38 106/31.78 |
| 6,305,382 B1 | * | 10/2001 | Hampl, Jr. | A24D 1/02 131/362 |
| 11,390,996 B2 | * | 7/2022 | Parker | D21H 25/005 |

(Continued)

FOREIGN PATENT DOCUMENTS

| | | |
|---|---|---|
| CN | 102 417 759 B | 6/2013 |
| CN | 106 928 771 A | 7/2017 |
| CN | 109 295 806 A | 2/2019 |
| CN | 109338792 A * | 2/2019 |

(Continued)

OTHER PUBLICATIONS

International Search Report issued in International Application No. PCT/US2021/058538, dated Feb. 18, 2022.
Written Opinion of the International Searching Authority issued in International Application No. PCT/US2021/058538, dated Feb. 18, 2022.
Transmittal of the International Preliminary Report on Patentability issued in International Application No. PCT/US2021/058538, dated May 25, 2023.
Japanese Office Action issued in counterpart JP Application No. 2023-528312, dated Oct. 25, 2023.

*Primary Examiner* — Brian K Talbot
(74) *Attorney, Agent, or Firm* — Marian E. Fundytus; Ostrolenk Faber LLP.

(57) ABSTRACT

The present invention provides a method for printing high opacity images or coatings using solvent based inks comprising hollow polymeric microspheres, wherein the inks do not contain titanium dioxide. The International Agency for Research on Cancer (IARC) has classified titanium dioxide as "possibly carcinogenic to humans," The method of the present invention allows one to avoid the use of inks that rely on titanium oxide for high opacity, which has become of importance for articles that come into contact with one's mouth, for example, cigarette tipping papers.

13 Claims, No Drawings

(56) References Cited

U.S. PATENT DOCUMENTS

| | | | | |
|---|---|---|---|---|
| 2005/0005947 | A1* | 1/2005 | Hampl, Jr. | A24B 15/287 |
| | | | | 131/365 |
| 2007/0251658 | A1* | 11/2007 | Gedevanishvili | D21H 21/14 |
| | | | | 131/365 |
| 2018/0092397 | A1* | 4/2018 | Pesendorfer | D21H 27/00 |
| 2019/0387788 | A1* | 12/2019 | Hideshima | A24D 1/02 |
| 2020/0063349 | A1* | 2/2020 | Parker | D21H 15/04 |
| 2021/0079237 | A1 | 3/2021 | Osorio et al. | |

FOREIGN PATENT DOCUMENTS

| | | |
|---|---|---|
| CN | 109 651 872 A | 4/2019 |
| CN | 111454611 A | 7/2020 |
| EP | 0 286 219 A2 | 10/1988 |
| EP | 0 838 166 A1 | 4/1998 |
| EP | 2386609 | 11/2011 |
| JP | S63-254176 | 10/1998 |
| JP | 2005-320381 | 11/2005 |
| JP | 2015-083684 | 4/2015 |
| JP | 2020-007396 | 1/2020 |
| WO | WO 97/03137 | 1/1997 |

* cited by examiner

TITANIUM DIOXIDE-FREE CIGARETTE TIPPING INKS

CROSS REFERENCE TO RELATED APPLICATIONS

The present application is a § 371 National Phase application based on PCT/US21/058538 filed Nov. 9, 2021, which claims the benefit of U.S. Provisional Application No. 63/112,736, filed Nov. 12, 2020 the subject matter of each of which is incorporated by reference in their entirety.

FIELD OF THE INVENTION

The present invention provides a method for printing an opaque, titanium dioxide-free image or coating on a substrate. A preferred substrate is cigarette tipping paper.

BACKGROUND OF THE INVENTION

Most cigarettes currently produced include a column of tobacco, wrapped in a cigarette wrapping paper, attached at one end to a filter. The column of tobacco is joined to the filter by specially made paper called tipping paper. Although there are some exceptions, conventional filters are generally formed from either compressed strips of paper or from cellulose acetate tow, a biobased cellulosic fiber. Some filters also include activated carbon.

Filters are attached to cigarettes to filter out particulate matter and other components that may be contained within the cigarette smoke. Filters are also used to blend air with the cigarette smoke when the cigarette is being puffed. The filters are made so that the ratio of air to cigarette smoke is maintained within carefully controlled limits to insure that the cigarette has a constant taste as it is smoked from start to finish. In order to accomplish this goal, the tipping paper surrounding the filter is typically perforated at an end adjacent to the tobacco column.

Cigarette filters are either wrapped filters or non-wrapped filters. Wrapped filters are made by wrapping a filter material with a paper known as plug wrap. The plug wrap is machine-rolled with a quantity of heated hot melt adhesive. While the adhesive is still hot, the filter material is anchored to the plug wrap. The plug wrap, which can be machine-perforated or highly porous, must have sufficient stiffness to hold the filter material in a column. As described above, wrapped and non-wrapped filters are attached to a cigarette rod by the tipping paper. The tipping paper is adhered to both the cigarette paper and the filter by an aqueous adhesive. Different methods of making filters and of attaching the filters to cigarettes are disclosed in U.S. Pat. No. 4,411,279, which is incorporated herein by reference in its entirety.

The tipping paper used to connect the filter to the tobacco column is a precisely designed high opacity paper product that must meet many requirements and specifications. For example, tipping paper must not discolor when the cigarette is smoked, must not dissolve or degrade when placed in the mouth, must cover discolorations in the filter when the cigarette is smoked, and must hide the union between the tobacco column and the filter. Tipping paper must be capable of being printed upon and should improve the overall appearance of the cigarette.

Tipping Paper is classified by weight. The typical range is 32-40 g/m². The paper used for the present application is 36 g/m². While tipping paper is lightweight, it must also have enough strength so that the paper does not break during high speed paper making, printing and cigarette making machines.

Tipping paper should also be capable of being coated with an adhesive without losing its aesthetic appearance and without compromising any of the above described characteristics. The tipping paper is designed so that the adhesive, once coated on the paper, does not bleed through the paper, which can interfere with the ingress of dilution air and lead to the build-up of adhesive material on machine parts contacted during assembly of the cigarette. Further, the tipping paper must be receptive to the adhesive so that the paper will sufficiently bond to both the filter and the tobacco column.

Currently, most high opacity tipping paper is made using titanium dioxide as a component pigment. Titanium dioxide is a white pigment, but it is often used as an opacifying agent in inks that also contain non-white colorants. For example, the familiar brown ink that is printed onto tipping paper used with cigarette filters to resemble the look of cork is typically provided by an ink colored by a combination of yellow, red, black pigments, and possibly other colorants, along with titanium dioxide to provide opacity. The titanium dioxide is typically added to the paper in amounts from about 30 percent to about 50 percent by weight. Adding titanium dioxide to tipping paper has proven to be an effective method for creating papers with high opacities and with a sufficient amount of strength. Tipping paper containing titanium dioxide is also well suited for use with the adhesives that bond the paper to the filter.

However, The International Agency for Research on Cancer (IARC) has classified titanium dioxide as "possibly carcinogenic to humans," based on studies that showed increased lung tumors in rats associated with titanium dioxide inhalation. Due to the reclassification of $TiO_2$, cigarette manufacturers would like to remove $TiO_2$ from all inks that will come in contact with the consumer mouth. Preferably, the replacement inks will match the existing color standards for tipping paper.

Wheeler, et al., EP 2386609 discloses aqueous pigmented coating compositions with a high pigment volume, which compositions comprise as opacifying pigments $TiO_2$ and optionally hollow polymeric particles.

Loria, U.S. Pat. No. 4,880,465, discloses an aqueous, non-pigmented, opaque ink composition suitable for use in ink jet printing, comprising a resin component, hollow microspheres, a suitable water-based carrier vehicle and optionally dyes. Solvent can be present in the carrier at 1 to 20%. The hollow microspheres contain a central void region and have an inside diameter from about 0.1 to about 0.5 micron and an outside diameter from about 0.4 to about 1 micron. The central void region is filled with a liquid capable of diffusing through the walls of said microspheres. The hollow microspheres act to effectively scatter light which is incident thereupon, producing the opaque image.

Mead, WO 97/03137, discloses water-based jet ink compositions useful for printing on glass, metal, plastic, and rubber surfaces, comprising an aqueous carrier, a polyamine, a colorant, and an acidic resin. The colorant includes a dye, a pigment, or a hollow polymeric microsphere. The hollow polymeric microsphere provides opacity to the ink. The hollow microspheres can be formed from a variety of polymers including cellulose derivatives, acrylic resins, polyolefins, polyamides, polycarbonates, polystyrene, copolymers of styrene and other vinyl monomers, vinyl polymers such as homo- or copolymers such as 2-ethyhexylacrylate, methyl methacrylate and copolymers of styrene with other vinyl monomers such as acrylonitrile, acrylic acid, and the like.

U.S. Pat. No. 4,880,465 and WO 97/03137 each employed hollow microspheres made of an acrylic/styrene copolymer that were commercially available as aqueous emulsions, e.g., Ropaque® OP-62, an aqueous emulsion containing 37.5% by weight of hollow microspheres of an acrylic/styrene copolymer available from the Rohm and Haas Company The above references all provide an aqueous ink prepared from aqueous microsphere emulsions. In some applications, aqueous inks, including those prepared from aqueous microsphere emulsions, are not desirable. For example, in cigarette tipping paper, aqueous inks can interact unfavorably with the aqueous adhesives used.

Osorio Murillo, US 2021/0079237, discloses white, solvent-based, high opacity inks and coatings comprising one or more binders, $TiO_2$ pigment, polymeric void hollowsphere particles, and one or more organic solvents. The polymeric hollowsphere particles preferably consist of polymeric resins comprising styrene-acrylate copolymers, and have an external diameter ranging from about 0.2 micron to about 0.5 micron. The hollow particles scatter more light than solid particles and the inks comprising them achieve a high level of opacity even when low levels of white pigments, such as $TiO_2$, are used. The use of colorants in the ink compositions was also disclosed. Dry, powdered microspheres, e.g., SunSpheres® Powder from Dow, developed for use in personal care products, such as sunscreen lotion, were used in preparation of these solvent-based inks, avoiding complications from unwanted water.

A need exists for a replacement to titanium dioxide in tipping paper. Preferably, the color standards for these new inks will not deviate from current delta E targets. At present, there is no solution that will provide for tipping paper that is not printed with a titanium dioxide containing ink, and that is lightweight, strong, and that meets all of the other requirements of a tipping paper, particularly opacity. Replacing the titanium dioxide containing inks used in the preparation of tipping paper, with a non-aqueous, opaque, titanium-free ink that can be readily formulated to meet existing color standards is a need currently unmet by the existing art.

BRIEF SUMMARY OF THE INVENTION

It has been found that certain hollow polymeric microspheres can be substituted for $TiO_2$ in a non-water-based ink system without diminishing opacity or negatively impacting the color. It also has been found that while the quantity of hollow polymeric microspheres in the ink may be slightly different than the amount of $TiO_2$ originally used, this is readily compensated for by a small difference in the amount of solvent. However, good results in opacity and color matching to the original ink can be obtained without making any other changes to the formulation, e.g., the same pigment combination from the $TiO_2$ ink provides acceptable color when used with the hollow polymeric microspheres.

In a particular aspect, the present invention provides a method of printing on cigarette tipping paper, the method comprising printing onto the cigarette tipping paper an ink or coating composition comprising:
a) 3-35 wt % hollow polymeric microspheres, based on the total weight of the composition, wherein the microspheres have an outside diameter of 0.2 to 1.5 microns, said microspheres comprising one or more polymers surrounding a void, wherein one or more of the polymers comprise acrylate monomer units, styrene monomer units, or both acrylate and styrene monomer units;
b) 2-30 wt % one or more resins, based on the total weight of the composition; and
c) one or more solvents;
d) wherein the ink or coating composition contains no titanium dioxide and less than 2 wt % water, based on the total weight of the composition.

The ink or coating used in the present invention provides high opacity when applied to a substrate. In many embodiments, the ink also comprises one or more dyes and/or pigments.

The present titanium dioxide free ink is solvent-borne and is essentially free from water, i.e., any water present is the result of minor contamination by adventitious water. The ink therefore contains no, or extremely low amounts of water, which is advantageous in certain embodiments. For example, when printing on tipping paper, water or other aqueous solvents may interfere with the aqueous adhesive used to adhere the tipping paper to the paper surrounding the tobacco column and the filter. Further, a low boiling point solvent such as ethanol, isopropanol or ethyl acetate will provide faster dry times than water.

Solvents useful in the present invention include aliphatic hydrocarbons, cyclic hydrocarbons, aromatic hydrocarbons, ketones, aldehydes, alcohols, ethers, esters and combinations thereof, but lower boiling point solvents such as ethanol, ethyl acetate, isopropanol, isopropyl acetate, etc., will be preferred in many embodiments.

The present invention provides a method for preparing a printed, opaque substrate, e.g., cigarette tipping paper, free of titanium dioxide.

In many embodiments, the ink of the invention comprises one or more colorants, e.g., dye and/or pigment. In one embodiment, it is shown that the present method can be used to provide cigarette tipping paper with excellent opacity and the same color that is presently obtained using $TiO_2$ containing inks.

DETAILED DESCRIPTION OF THE INVENTION

The present invention provides titanium-dioxide free, high opacity solvent-based inks comprising hollow polymeric microspheres, and methods of using the inks to prepare titanium-dioxide free substrates. In many embodiments, colorants e.g., dyes and/or pigments are also included in the ink. The inks are suitable for use on substrates that come into contact with one's mouth and therefore must avoid $TiO_2$, e.g., cigarette tipping paper.

In a particular aspect, the present invention provides a method of preparing a titanium dioxide-free printed article, the method comprising printing onto a substrate a solvent-based titanium free ink or coating composition comprising:
a) 3-35 wt % hollow polymeric microspheres, based on the total weight of the composition, wherein the microspheres have an outside diameter of 0.2 to 1.5 microns, said microspheres comprising one or more polymers surrounding a void, wherein one or more of the polymers comprise acrylate monomer units, styrene monomer units, or both acrylate and styrene monomer units;
b) 2-30 wt % one or more resins, based on the total weight of the composition; and
c) one or more solvents;

d) wherein the ink or coating composition contains no titanium dioxide and less than 2 wt % water, based on the total weight of the composition.

It is to be understood that the foregoing general description and the following detailed description are exemplary and explanatory only, and are not restrictive of any subject matter claimed.

Headings are used solely for organizational purposes, and are not intended to limit the invention in any way.

Unless otherwise defined, all technical and scientific terms used herein have the same meaning as is commonly understood by one of ordinary skill in the art to which the inventions belong. All patents, patent applications, published applications and publications, websites and other published materials referred to throughout the entire disclosure herein, unless noted otherwise, are incorporated by reference in their entirety for any purpose. Although any methods and materials similar or equivalent to those described herein can be used in the practice or testing of the present invention, the preferred methods are described.

Definitions

In this application, the use of the singular includes the plural unless specifically stated otherwise. As used herein, the singular forms "a," "an" and "the" are intended to include the plural forms as well, unless the context clearly indicates otherwise.

In this application, the use of "or" means "and/or" unless stated otherwise.

As used herein, the terms "comprises" and/or "comprising" specify the presence of the stated features, integers, steps, operations, elements, and/or components, but do not preclude the presence or addition of one or more other features, integers, steps, operations, elements, components, and/or groups thereof. Furthermore, to the extent that the terms "includes," "having," "has," "with," "composed," "comprised" or variants thereof are used in either the detailed description or the claims, such terms are intended to be inclusive in a manner similar to the term "comprising."

When the terms "consist of", "consists of" or "consisting of" is used in the body of a claim, the claim term set off with "consist of", "consists of" and/or "consisting of" is limited to the elements recited immediately following "consist of", "consists of" and/or "consisting of", and is closed to unrecited elements related to that particular claim term. The term 'combinations thereof', when included in the listing of the recited elements that follow "consist of", "consists of" and/or "consisting of" means a combination of only two or more of the elements recited.

As used herein, ranges and amounts can be expressed as "about" a particular value or range. "About" is intended to also include the exact amount. Hence "about 5 percent" means "about 5 percent" and also "5 percent." "About" means within typical experimental error for the application or purpose intended.

It is to be understood that wherein a numerical range is recited, it includes all values within that range, and all narrower ranges within that range, whether specifically recited or not.

As used herein, the term "opacity" of a pigmented ink or coating refers to its ability to cover the color or color differences of a substrate. Opacity depends on the amount of light that is transmitted through, or reflected from, the surface of the ink. More opaque colorants have a greater tendency to reflect and refract light.

As used herein, the terms "(meth)acrylate," "(meth)acrylic acid," or "acrylate" include both acrylate and methacrylate compounds, and both acrylic acid and methacrylic acid, unless specified otherwise.

As used herein, the term "binder" means polymeric or resinous component that binds to the colorant or pigment. The binder can be one polymeric or resinous component, or a combination of more than one polymeric or resinous component. The binder may serve to adhere the pigment to the substrate, or to keep a pigment uniformly dispersed in a fluid ink vehicle. When referring to the amount of binder in a composition, it refers to the weight of the material used, including the actual binder resin and any diluents or other additives present in the form in which it is used (e.g. binder in ethanol), when the recited weight is based on the total weight of the composition. When the amount of binder is recited on a solid weight basis, this refers to the amount of the actual resin (solids), after the other components (e.g. ethanol) are removed. For example, a composition may comprise 30 wt % of binder material which is a 25% solids solution in ethanol, based on the total weight of the composition. The actual binder resin (solids) that is present based on a solid weight basis is 30(0.25)=7.5 wt %.

As used herein, the term "polymer" includes both homo- and co-polymers.

As used herein, the terms "polymeric void spherical particles," "hollowsphere particles," and "hollowspheres" "hollow microspheres", and "hollow polymeric microspheres" are used interchangeably, and refer to polymer spheres that have an outer wall and an inner wall, wherein the inner wall surrounds a void (i.e. air filled space).

As used herein, the terms "solvent-based ink or coating composition(s)," "solvent-based coating compositions(s)," "solvent-based ink composition(s)," "solvent-based coating(s)," "solvent-based ink(s)," "coating(s)," "coating composition(s)," "ink(s)", "ink compositions(s)," "compositions" and the like are used interchangeably. As used herein, coatings and related terms include inks, and vice-versa.

As used herein, "substrate" means any surface or object to which an ink or coating can be applied. Substrates include, but are not limited to, cellulose-based substrates, paper, paperboard, fabric, leather, textiles, felt, concrete, masonry, stone, plastic, plastic or polymer film, glass, ceramic, metal, wood, composites, combinations thereof, and the like. Substrates may have one or more layers of metals or metal oxides, or other inorganic materials.

As used herein, the term "article" or "articles" means a substrate or product of manufacture. Examples of articles include, but are not limited to: substrates such as cellulose-based substrates, paper, paperboard, plastic, plastic or polymer film, glass, ceramic, metal, composites, and the like; and products of manufacture such as publications (e.g. brochures), labels, and packaging materials (e.g. cardboard sheet or corrugated board), containers (e.g. bottles, cans), a polyolefin (e.g. polyethylene or polypropylene), a polyester (e.g. polyethylene terephthalate), a metalized foil (e.g. laminated aluminum foil), metalized polyester, a metal container, and the like.

Throughout this disclosure, all parts and percentages are by weight (wt % or mass % based on the total weight) and all temperatures are in ° C. unless otherwise indicated.

Compositions and Uses Thereof

The present invention provides titanium dioxide-free, high opacity solvent-based inks comprising hollow polymeric microspheres and methods of using the inks to prepare titanium dioxide-free substrates. In many embodiments, colorants e.g., dyes and pigments, are also included in the ink. The inks are suitable for use on substrates that come into contact with one's mouth and therefore need to avoid titanium oxide, e.g., cigarette tipping paper. In one embodiment, the invention provides a method for printing on substrates using inks that are free of $TiO_2$ and contain little to no water In a particular aspect, the present invention provides a method of preparing a titanium dioxide-free printed article, the method comprising printing onto a substrate a solvent-based titanium dioxide-free ink or coating composition comprising, based on the total weight of the composition:
- a) 3-35 wt % hollow polymeric microspheres, wherein the microspheres have an outside diameter of 0.2 to 1.5 microns, said microspheres comprising one or more polymers surrounding a void, wherein one or more of the polymers comprise acrylate monomer units, styrene monomer units, or both acrylate and styrene monomer units;
- b) 2-30 wt % one or more resins; and
- c) 40 to 90 wt % one or more solvents;
- d) wherein the ink or coating composition contains no titanium dioxide and less than 2 wt % water, based on the total weight of the composition.

In various embodiments, the ink composition comprises, based on the total weight of the composition:
- a) 3-35 wt %, 5 to 25 wt %, or 5 to 15 wt % hollow polymeric microspheres;
- b) 2-30 wt %, 2-20 wt %, or 4 to 15 wt % one or more resins;
- c) 35 to 90 wt %, 40 to 80 or 45 to 65 wt % one or more solvents; and
- d) less than 2 wt %, less than 1.0 wt %, less than 0.5 wt %, or less than 0.1 wt % water.

In preferred embodiments, the ink contains no water.

In many embodiments the ink composition further comprises, based on the total weight of the composition: 3 to 4 wt %, 5 to 40 wt %, or 8 to 35 wt % one or more pigments.

The hollow microspheres of the invention can be formed from a variety of polymers including cellulose derivatives, acrylic resins, polyolefins, polyamides, polycarbonates, polystyrene, copolymers of styrene and other vinyl monomers, vinyl polymers such as homo- or copolymers such as 2-ethyhexylacrylate, methyl methacrylate and copolymers of styrene with other vinyl monomers such as acrylonitrile, acrylic acid, and the like. For example, hollow microspheres made of polymers comprising one or more one or more acrylic monomer and/or styrenic monomer repeating units are useful in the invention, e.g., excellent results have been obtained using hollow microspheres made of co-polymers comprising one or more acrylic monomer and one or more styrene monomer repeating units.

To prevent water from entering the composition, the use of hollow microspheres prepared or sold as aqueous dispersions is discouraged. Commercial hollow polymeric microspheres are commercially available as powders, e.g., Sun-Spheres® Powder from Dow, and have been used successfully in formulating inks for the present invention.

Of particular significance with respect to the hollow microspheres of the present invention is that said microspheres in fact are hollow. Thus, microspheres which do not contain a void or microvoid are not suitable. This is particularly true given that one of the mechanisms by which the present inks are believed to provide high opacity, is that the hollow microspheres scatter more light than solid particles. It is further postulated that the hollow microspheres disperse more readily throughout the coating and remain more evenly dispersed in the dried coating after evaporation of the solvent.

There are some constraints on the size of the microsphere. The microsphere must be able to stay in a reasonably dispersed state in the ink during printing or application of a coating. It also must not be so large as to interfere with the mechanics of the printer being used, but it should still be large enough to effectively scatter light. The hollow microspheres of the invention have an outside diameter of 0.2 to 1.5 microns and typically an inside diameter, i.e., the diameter of the hollow space inside the microsphere, of 0.1 to 1.2 microns.

In various embodiments, the polymeric hollow microsphere of the invention has:
- an outside diameter of 0.2 to 1.5 microns, 0.4 to 1 micron. 0.3 to 0.7 microns, 0.2 to 0.5 microns, or 0.5 to 0.7 microns; and
- an inner diameter of 0.1 to 1.2 microns, 0.1 to 0.5 micron, 0.2 to 0.6 micron, 0.2 to about 0.4 micron.

For example, in various embodiments the hollow polymeric microsphere of the invention has: an outside diameter of 0.2 to 1.5 microns and an inside diameter of 0.1 to 1.2 microns, an outside diameter of 0.4 to 1.0 micron and an inside diameter of 0.1 to 0.5 microns, an outside diameter of 0.3 to 0.7 microns and an inside diameter of 0.2 to 0.6 microns, or an outside diameter of 0.5 to 0.7 microns and an inside diameter of 0.2 to 0.4 microns.

A variety of resins, e.g., binder resins, are known for use in ink or coating compositions and almost any can be used in the present invention. The one or more resins act as a binder component and have the purpose, among others, to promote the adhesion of the ink formulation on the printing surface. However, the selected resin should not react chemically with the hollow microspheres and must be at least dispersible in the liquid carrier vehicle.

Resins useful in the invention are typically selected from the group consisting of nitrocellulose, alkyds, phenolics, polyamides, vinyls, acrylics, rosin esters, hydrocarbons, polyurethane, epoxies, polyesters, styrenes, urea, melamine-formaldehydes and combinations thereof. In certain embodiments, the resin component comprises nitrocellulose or a mixture of nitrocellulose with one or more other resins.

There is no particular limitation on the solvents(s) used in the ink formulation, and excellent results can be obtained using solvents such as ethanol, ethyl acetate, isopropanol, or isopropyl acetate. Other solvents may include aliphatic hydrocarbons, cyclic hydrocarbons, aromatic hydrocarbons, ketones, aldehydes, alcohols, ethers, esters, etc., and blends thereof.

Suitable colorants include but are not limited to: organic or inorganic pigments and dyes. The dyes include but are not limited to fluorescent dyes, azo dyes, anthraquinone dyes, xanthene dyes, azine dyes, combinations thereof and the like. Organic pigments may be one pigment or a combination of pigments, such as for instance Pigment Yellow Numbers 12, 13, 14, 17, 74, 83, 114, 126, 127, 174, 188; Pigment Red Numbers 2, 22, 23, 48:1, 48:2, 52, 52:1, 53, 57:1, 112, 122, 166, 170, 184, 202, 266, 269; Pigment Orange Numbers 5, 16, 34, 36; Pigment Blue Numbers 15, 15:3, 15:4; Pigment Violet Numbers 3, 23, 27; and/or Pigment Green Number 7. Inorganic pigments may be one of the following non-limiting pigments: iron oxides, chromium oxides, ferric ammonium ferrocyanides, ferric oxide blacks, Pigment Black Number 7 and/or Pigment White Number 7. Other organic and inorganic pigments and dyes can also be employed, as well as combinations that achieve the colors desired.

The inks of this invention may contain the usual extenders such as clay, talc, calcium carbonate, magnesium carbonate, etc. to improve opacity and color strength. In many embodiments there additives typically found in printing inks may also be present, such as for example adhesion promoters, silicones, light stabilizers, optical brighteners, de-gassing additives, ammonia, flow promoters, defoamers, antioxidants, stabilizers, surfactants, dispersants, plasticizers, rheological additives, etc. waxes, silicones, etc.

The inks used in the present invention are prepared by mixing the components of the composition in any conventional manner.

Any printing method may be used in the present invention, e.g., gravure, flexographic, lithographic, ink jet, and the like. In one embodiment, the inks would be printed by gravure.

Although the preferred use for the inks of the present invention is for decorating tipping papers used in cigarette manufacture, the inks can also be used for other end use applications and substrates including paper, paperboard and plastic films (e.g., e-cigarettes), among others.

EXAMPLES

The invention is further described by the following non-limiting examples which illustrate the invention, and are not intended, nor should they be interpreted to, limit the scope of the invention.

Color Measurement

In the following Examples, spectrophotometer color measurements were obtained using a GretagMacbeth Spectro-Eye, using the following settings, no filter, normalized Illuminant D50, and Observer Angle of 2°. The data was analyzed using X-rite Color Quality software, which was also used to calculate dE and dE2000.

Delta E (dE, also known as $dE_{ab}$) and delta E2000 (dE2000) are industrially recognized standards for reporting the difference between two colors. In the following examples, differences in colors were determined by visual examination and spectrophotometric measurements. dE and dE2000 are calculated using spectrophotometer measurements of L*a*b* values as defined in CIELAB color space by the Commission Internationale de l'Eclairage (CIE), in 1976.

L*=lightness value;
a*=red/green value, where positive values indicate amounts of red, and negative values indicate amounts of green;
b*=yellow/blue value, where positive values indicate amounts of yellow,
and negative values indicate amounts of blue.

These values are the coordinates that define the color in a three dimensional space. Delta E is the calculated difference, or distance, between the color points of the two colors as determined by their L*, a* and b*coordinates. To arrive at dE, the difference in L*, a*, and b* values for each of the two colors is determined:

Delta L*=(L* 1 minus L* 2); and is the difference in lightness and darkness (a positive value is lighter, a negative value is darker)

Delta a*=(a* 1 minus a* 2) and is the difference in red and green (positive value is redder, negative value is greener)

Delta b*=(b* 1 minus b* 2) and is the difference in yellow and blue (positive value is more yellow, negative value is bluer)

dE is determined by the calculating the square root of: $[(\text{Delta } L^*)^2 + [(\text{Delta } a^*)^2 + [(\text{Delta } b^*)^2]$.

dE is an absolute value, and is therefore always a positive number.

dE2000 is an update of the dE equation attempting to take into account that the human eye is more sensitive to certain colors than others. DE 2000 can use values from various color spaces, e.g., RGB, CMY, CMYK, HSL, HSB, XYZ, CIE-L*ab, CIE-Lch.

For example, the calculations can start with the L*a*b* values described above. These values are used to determine values for L* (lightness), C* (Chroma) and h° (hue). L* is the same as above and C and h° are calculated from the a* and b* values. The calculations to arrive at DE2000 incorporate several weighting factors, such as compensation for neutral colors, compensation for lightness compensation for chroma and compensation for hue, e.g., dE2000 varies the weighting of L* depending on where in the lightness range the color falls. These calculations are typically carried out using commercially available software, as in the present Examples. Further details are found, e.g., in Gaurav Sharma, Wencheng Wu, Edul N. Dalal, "The CIEDE2000 Color-Difference Formula: Implementation Notes, Supplementary Test Data, and Mathematical Observations", © 2004 Wiley Periodicals, Inc., Col Res Appl, 30, 21-30, February 2005; Published online in Wiley InterScience (www.interscience.wiley.com). The color difference between inventive examples printed with the inventive titanium dioxide-free inks, and comparative examples with commercially available inks containing titanium dioxide was measured as described below.

Several tobacco inks based on iron oxide pigments were tested by removing all $TiO_2$ and replacing it with the styrene/acrylic hollow polymer microspheres to compare color and opacity. Inks were applied on white and yellow tipping paper with a #5 Meyer rod at a print viscosity of 20 seconds #2 Zahn cup and were assessed visually and by Spectrophotometer readings.

Examples 1 and 2: Tipping Inks

Tipping inks were prepared according the formulations shown below. Comparative Example 1 is a conventional tipping ink containing titanium dioxide. Inventive Example 2 is an ink of the invention, containing hollow polymeric microspheres instead of titanium dioxide.

Comparative Example 1: Tipping Ink Based on Titanium Dioxide

| Material | wt % |
| --- | --- |
| Isopropyl Acetate | 53.8 |
| Ethanol | 3.1 |
| Cellulose Nitrate | 7.4 |
| Yellow Iron Oxide | 16.8 |
| Red Iron Oxide | 2.1 |
| Black Iron Oxide | 1.5 |
| Titanium Dioxide | 6.6 |
| Calcium Carbonate | 3.4 |
| Talc | 3.3 |
| Triacitin | 2.0 |
| Total | 100 |

Inventive Example 2: Tipping Ink Based Styrene/Acrylic Polymer Hollowspheres

| Material | wt % |
|---|---|
| Isopropyl Acetate | 50.5 |
| Ethanol | 3.1 |
| Cellulose Nitrate | 7.4 |
| Yellow Iron Oxide | 16.8 |
| Red Iron Oxide | 2.1 |
| Black Iron Oxide | 1.5 |
| Styrene/Acrylic Polymer Hollow Microspheres | 9.9 |
| Calcium Carbonate | 3.4 |
| Talc | 3.3 |
| Triacitin | 2.0 |
| Total | 100 |

Comparative Example 1 and Inventive Example 2 were printed onto white tipping paper and were found to be an acceptable visual color match. An acceptable color match is subjective but is well understood in the art to be a color match with minimal color difference when printed side-by-side with a standard. One of skill in the art of color matching would know an acceptable match by visual comparison.

To further demonstrate that the color match is acceptable, spectrophotometer readings were taken using a GretagMacbeth SpectroEye Spectrophotometer, (no filter, Illumination: D50, Observer Angle:2°), and the dE (i.e., $dE_{ab}$) and dE2000 relative to a previously determined color standard was calculated using X-rite Color Quality software. dE2000 is reported herein. In addition to being an acceptable visual match, the 2 prints would preferably have, relative to the previously determined color standard, a dE or dE2000 value ≤2.00, more preferably ≤1.50, most preferably ≤1.00. Readings for Comparative Example 1 vs. Inventive Example 2 on white tipping paper are as follows and show the match to be well within preferred guidelines:

TABLE 1

L* a* b* and dE2000 values on white tipping paper:

| | Comp. Ex. 1 | Inv. Ex. 2 |
|---|---|---|
| L* | 65.56 | 65.99 |
| a* | 24.55 | 23.76 |
| b* | 44.83 | 44.04 |
| C* | 51.12 | 50.04 |
| h | 61.29 | 61.65 | dE2000 = 0.52

Comparative Example 1 and Inventive Example 2 were then printed onto buff (colored) tipping paper and were shown to be an acceptable visual color match. To further demonstrate that the color match is acceptable, spectrophotometer readings were taken using a GretagMacbeth SpectroEye Spectrophotometer with the above settings.

Readings for Comparative Example 1 vs. Inventive Example 2 on buff tipping paper are as follows and show the match to be well within preferred guidelines:

TABLE 2

L* a* b* and dE 2000 values on buff (colored) tipping paper:

| | Comp. Ex. 1 | Inv. Ex. 2 |
|---|---|---|
| L* | 63.34 | 64.24 |
| a* | 24.11 | 22.98 |
| b* | 43.22 | 42.22 |
| C* | 49.49 | 48.07 |
| h | 60.85 | 61.44 | dE2000 = 0.94

Examples 3 to 6: Additional Tipping Inks

Further examples of sets of comparative and inventive inks that exhibited a good visual color match are as follows:

Comparative Example 3: Tipping Ink Based on Titanium Dioxide

| Material | wt % |
|---|---|
| Isopropyl Acetate | 49.7 |
| Ethanol | 3.2 |
| Cellulose Nitrate | 7.5 |
| Yellow Iron Oxide | 23.1 |
| Red Iron Oxide | 1.5 |
| Black Iron Oxide | 2.3 |
| Titanium Dioxide | 5.8 |
| Calcium Carbonate | 2.1 |
| Talc | 3.0 |
| Triacitin | 1.8 |
| Total | 100 |

Inventive Example 4: Tipping Ink Based on Styrene/Acrylic Hollow Polymer Spheres

| Material | wt % |
|---|---|
| Isopropyl Acetate | 46.8 |
| Ethanol | 3.2 |
| Cellulose Nitrate | 7.5 |
| Yellow Iron Oxide | 23.1 |
| Red Iron Oxide | 1.5 |
| Black Iron Oxide | 2.3 |
| Styrene/Acrylic Hollow Polymer Microspheres | 8.7 |
| Calcium Carbonate | 2.1 |
| Talc | 3.0 |
| Triacitin | 1.8 |
| Total | 100 |

Comparative Example 3 and Inventive Example 4 were printed onto white tipping paper and buff tipping paper and were shown to be an acceptable visual color match.

Comparative Example 5: Tipping Ink Based on Titanium Dioxide

| Material | % |
| --- | --- |
| Isopropyl Acetate | 52.3 |
| Ethanol | 3.5 |
| Cellulose Nitrate | 8.4 |
| Yellow Iron Oxide | 9.2 |
| Red Iron Oxide | 2.1 |
| Black Iron Oxide | 1.1 |
| Titanium Dioxide | 6.2 |
| Calcium Carbonate | 4.6 |
| Talc | 5.7 |
| Triacitin | 4.9 |
| Clay | 2.0 |
| Total | 100 |

Inventive Example 6: Tipping Ink Based Styrene/Acrylic Hollow Polymeric Microspheres

| Material | wt % |
| --- | --- |
| Isopropyl Acetate | 49.2 |
| Ethanol | 3.5 |
| Cellulose Nitrate | 8.4 |
| Yellow Iron Oxide | 9.2 |
| Red Iron Oxide | 2.1 |
| Black Iron Oxide | 1.1 |
| Styrene/Acrylic Polymer Hollow Microspheres | 9.3 |
| Calcium Carbonate | 4.6 |
| Talc | 5.7 |
| Triacitin | 4.9 |
| Clay | 2.0 |
| Total | 100 |

Comparative Example 5 and Inventive Example 6 were printed onto white tipping paper and buff tipping paper and were shown to be an acceptable visual color match.

The present invention has been described in detail, including the preferred embodiments thereof. However, it will be appreciated that those skilled in the art, upon consideration of the present disclosure, may make modifications and/or improvements on this invention that fall within the scope and spirit of the invention

The invention claimed is:

1. A method of printing on cigarette tipping paper, the method comprising printing onto the cigarette tipping paper an ink or coating composition comprising:
   a) 3-35 wt % of hollow polymeric microspheres, based on the total weight of the composition, wherein the microspheres have an outside diameter of 0.2 to 1.5 microns, said microspheres comprising one or more polymers surrounding a void, wherein one or more of the polymers comprise acrylate monomer units, styrene monomer units, or both acrylate and styrene monomer units;
   b) 2-30 wt % of one or more resins, based on the total weight of the composition, wherein the resin comprises nitrocellulose or a mixture of nitrocellulose with one or more other resins; and
   c) one or more solvents;
   wherein the ink or coating composition contains no titanium dioxide, without diminishing opacity, and less than 2 wt % water, based on the total weight of the composition.

2. The method of claim 1, wherein the microsphere void is surrounded by one or more polymers comprising styrene-acrylate copolymers.

3. The method of claim 1, wherein the microspheres have an inside diameter of 0.1 to 1.2 microns.

4. The method of claim 1, wherein the ink or coating composition further comprises one or more colorants.

5. The method of claim 4, wherein at least one colorant is a non-white dye.

6. The method of claim 5, wherein the dye is selected from the group consisting of a fluorescent dye, azo dye, anthraquinone dye, xanthene dye, azine dye, and combinations thereof.

7. The method of claim 4, wherein at least one colorant comprises a non-white organic pigment, a non-white inorganic pigment, or a combination thereof, which pigment is present in the ink at 10 to 40 wt %, based on the total weight of the ink or coating composition.

8. The method of claim 7 wherein the inorganic pigment is selected from the group consisting of an iron oxide, chromium oxide, ferric ammonium ferrocyanide, ferric oxide black, carbon black pigment, and combinations thereof.

9. The method of claim 1, wherein the one or more resins are a mixture of nitrocellulose with one or more other resins selected from the group consisting of alkyds, phenolics, polyamides, vinyls, acrylics, rosin esters, hydrocarbons, polyurethane, epoxies, polyesters, styrenes, urea, melamine-formaldehydes, and combinations thereof.

10. The method of claim 1, wherein the one or more solvents are selected from the group consisting of aliphatic hydrocarbons, cyclic hydrocarbons, aromatic hydrocarbons, ketones, aldehydes, alcohols, ethers, esters, and combinations thereof.

11. The method of claim 1, wherein the one or more solvents are selected from the group consisting of ethanol, ethyl acetate, isopropanol, isopropyl acetate, and combinations thereof.

12. The method of claim 1, wherein the ink or coating composition further comprises one or more additives and/or extender pigments.

13. The method of claim 1, wherein the ink composition is printed by rotogravure or flexographic printing.

* * * * *